United States Patent Office 3,355,248
Patented Nov. 28, 1967

3,355,248
PROCESS FOR PRODUCING HYDROGEN AND CARBON WITH AN ESSENTIALLY IRON-FREE CATALYST
John C. Hayes, Palatine, Ill., assignor to Universal Oil Products Company, Des Plaines, Ill., a corporation of Delaware
No Drawing. Filed Dec. 16, 1963, Ser. No. 330,661
4 Claims. (Cl. 23—209.5)

ABSTRACT OF THE DISCLOSURE

A process for decomposing gaseous hydrocarbons into hydrogen and carbon in contact with nickel-silica-alumina catalyst free of iron.

---

The present invention relates to an improved means for increasing the hydrogen yield from the decomposition of a normally gaseous hydrocarbon stream and more particularly to the use of an improved substantially iron free catalyst for effecting the decomposition of methane or other light hydrocarbon stream to hydrogen and coke with a minimum of carbon monoxide contamination in the product stream.

Hydrocarbon oils and gases, such as are readily and abundantly available from petroleum process operations, provide an excellent source of hydrogen and as a result improved processing steps have been designed to effect the conversion of such hydrocarbons to hydrogen. Normally gaseous hydrocarbons, such as methane, are considered to be a particularly attractive source of hydrogen because of the high ratio of hydrogen to carbon. Further, the catalytic decomposition of hydrocarbons to hydrogen provides optimum yields and an advantageous method of effecting hydrogen production, with such catalysts including supported platinum and iron group metals. In connectoion with prior associated development work it has been found that catalysts which have a base or support material of a high alumina content provide better yields and higher hydrogen purity. Also of particular concern, in an optimum operation, is the contamination of the hydrogen product stream with carbon monoxide such that considerable work hast been done in the direction of reducing this carbon oxide contamination. The more active catalysts have been found to give the lowest levels of carbon monoxide production, of the order of 1% to 2%; however, it has been difficult to remove the final 1% of such contamination. Still further, it has been found that in the iron group metals, the iron catalysts are particularly inferior, as compared with nickel, for the conversion of methane in a cyclic process where the catalyst is subjected in alternating contacting steps to both reaction and regeneration for the removal of carbonaceous deposit. In other words, iron, as well as other metals such as cobalt, molybdenum, chromium, silver and the like, when subjected to short cyclic periods of reaction and regeneration in carrying out a continuous operation for the decomposition of methane at elevated temperature conditions of the order of 1400° to 1800° F., are prone to undergo actual states of cyclic oxidation and reduction and thus produce large quantities of water, carbon monoxide and carbon dioxide in the product gas, such that hydrogen purity is substantially unsatisfactory. Conversely, it appears that nickel as an activating component on a support has far less tendency to combine with oxygen and undergo oxidation such that it provides good product yields with a high degree of purity, as long as iron or other contaminating metals are not present therewith to undergo the cyclic oxidation and reduction to effect undesired carbon oxide production.

It is thus a principal object of this invention to utilize a nickel containing decomposition catalyst for hydrogen production that is substantially free of contaminating metals.

More specifically, it is an object of the present invention to utilize a nickel containing catalyst composition which is substantially free of iron in effecting the decomposition of a hydrocarbon stream to produce a substantially pure hydrogen product stream.

Iron contamination is a particularly troublesome material since it may enter into the catalyst composition from the raw materials providing the formation of catalyst support or it may enter into the catalyst stream from equipment utilized in the catalyst preparation. For example, iron may enter into the composition from treating chambers, pipe lines, spray dryers, calcining furnaces, conveyor belts and the like. Also, of course, free iron may admix with or attach itself to a moving stream of catalyst particles in aprocessing unit, with the iron content gradually building up over a period of time.

In a broad aspect, the present invention provides a method for improving the decomposition conversion of a normally gaseous hydrocarbon charge stream to carbon and hydrogen in a manner which comprises contacting the stream at decomposition conditions with a catalyst consisting of alumina, silica and nickel and that is substantially free of iron.

In a somewhat more specific embodiment the present invention provides a method for effecting the fluidized contact of a normally gaseous hydrocarbon stream in a manner which comprises effecting the conversion of such stream to hydrogen and carbon at decomposition conditions in a moving column of catalyst particles which consists of a major proportion of alumina, a lesser proportion of silica, from about 5% to about 15% nickel by weight of the composite, and containing less than about 0.01% by weight of iron.

As set forth hereinbefore, a high alumina content with a decomposition catalyst is preferable for providing a high activity catalyst. Prior associated work has shown that an alumina-nickel catalyst is preferable to a silica-alumina-nickel catalyst, particularly where the silica comprises a major proportion of the composite. Thus, although alumina may serve as the support for the nickel or the active catalyst component, its primary value lies in its contribution to the overall activity of the catalyst composite in effecting a high yield of hydrogen in the decomposition of the normally gaseous hydrocarbon stream. The activity of the catalyst composite may in part result in an independent effect exerted by the alumina or more preferably the activity may result by reason of a particular association of the alumina with nickel as the preferred active component.

An illustrative showing of the advantage of the high alumina content catalyst is the following comparative data which was obtained from laboratory research work in connection with various catalyst compositions. In all cases the catalyst was in a microspherical form and was utilized to contact a methane charge stream at decomposition conditions with a reactor temperature of the order of 1600° F.

| Support Descrip. | Active Metal Comp., Percent Ni | Maximum CH$_4$ Conv., Percent | CO+CO$_2$ in Prod., Percent |
|---|---|---|---|
| 96% Al$_2$O$_3$=4% SiO$_2$ | 10 | 89 | 1.5 |
| 92% Al$_2$O$_3$=8% SiO$_2$ | 10 | 82 | 2.5 |
| 88% Al$_2$O$_3$=12% SiO$_2$ | 10 | 71 | 2.5 |
| 65% Al$_2$O$_3$=35% SiO$_2$ | 10 | 65 | 6.0 |
| 52% Al$_2$O$_3$=48% SiO$_2$ | 10 | 54 | 9.5 |

The alumina for the support may be synthetically prepared, or may be of a naturally occuring alumina such as is recovered from bauxite. Synthetically prepared alumina may be of the gel type generally prepared by precipitation methods. For example, an alkaline reagent such as ammonium hydroxide, ammonium carbonate, etc., is commingled with an acidic solution of an aluminum salt, which may be an aqueous solution of aluminum chloride, aluminum sulfate, aluminum nitrate, and the like, to precipitate the desired alumina. Alternatively, alumina may be precipitated by commingling hydrochloric acid, sulfuric acid, nitric acid, or the like, with na alkaline solution of a suitable aluminum salt such as sodium aluminate, potassium aluminate, etc. The silica content of the carrier may be obtained by coprecipitation with the alumina. For example, a solution of sodium silicate may be formed into a sol to admix with an alumina sol to provide an alumina-silica composite gel.

When alumina or alumina-silica composite is desired in a particular form, then the dried alumina-silica composite may be subsequently formed into particles of definite size and shape. One method comprises commingling the material in a powdered form with a suitable pelleting agent, for example, hydrogenated vegetable oil, graphite, etc., and forming the alumina into pills or pellets. The alumina support may also be formed into the desired shape by extrusion methods, etc., or it may be utilized in the form of a powder or granules of different size and shape.

Where alumina or an alumina-silica base is desired in a spherical pill form, another suitable method of preparing and forming the alumina comprises digesting aluminum in an acid, such as hydrochloric acid at a controlled pH, and discharging a resulting sol through dropping tips or by means of a nozzle or rotating disc, into a water immiscible suspending medium, such as oil, and forming firm gel particles during passage therethrough. Silica or other inorganic oxides may be added to the alumina while it is in the sol or gel form prior to the sphere formation. The spheres may be removed from the bath in any suitable manner such as by a stream or water disposed beneath the oil layer. The spheres are thereafter dried in the same manner as described for the previous preparations. In still another type of operation for producing alumina or an alumina-silica composite in an microspherical support form for use in fluidized operations, the gel may be processed through a spray dryer or a spinning disc arrangement which will form microspheres or macrospheres of a desired size.

Regardless of the source or method of preparation, the dried alumina support is usually subjected to calcination at a temperature of at least 900° F., and generally at a temperature of from about 900° F. to about 1500° F., to yield a substantially anhydrous alumina. A particularly preferred calcination temperature is from about 1100° F. to about 1300° F. The calcination may be effected in any suitable atmosphere. Usually the calcination is effected in the presence of air or other oxidizing media although in some cases it may be effected in a reducing atmosphere such as hydrogen, or an inert atmosphere such as nitrogen. The time of calcination will vary with the temperature of calcination. Generally, the time of calcination will be from about 0.5 to about 10 hours.

The improved nickel containing catalyst of this invention may be prepared by impregnating the alumina or alumina-silica support with a suitable aqueous solution of a nickel salt, as for example nickel nitrate, nickel formate, or an acid salt such as nickel chloride and nickel sulfate with an ammoniacal solution which will convert the salt to the metal oxide, followed by heating to drive off the volatile components. There may be successive dippings of the support into the impregnating solution or there may be a continuous soaking for a period of one or more hours until the particular type of support acquires the desired amount of the active metal component which will be retained after rinsing and drying of the composite.

The impregnated catalyst may be calcined or reduced, or both, however, preferably the dried composite is subjected to a reduction in a hydrogen atmosphere at about 900° to 1100° F. for several hours, which may be from about 4 to 10 hours. In all cases, and in accordance with the present invention, the high alumina content alumina-nickel or alumina-silica-nickel catalyst is prepared and treated to be substantially free of iron or other contaminating metal components which are prone to being readily oxidized and reduced.

The conversion of normally gaseous hydrocarbons is effected in accordance with the present process by contacting said hydrocarbons with the above described improved catalyst composite at a decomposition reaction temperature from about 1300° F. to about 1700° F. or more. Pressure should be kept to a minimum, however, in a fluidized operation it may be necessary to use low superatmospheric pressure to effect a process flow between processing chambers.

The present hydrogen producing process may be effected in any conventional or otherwise convenient manner. One method comprises locating the catalytic composite in a fixed bed within a reactor. The hydrocarbon charge is passed therethrough at the desired decomposition reaction temperature, in either upward or downward flow, and the reactor effluent is withdrawn from the reactor at a rate which will insure an adequate residence time therein. In this type of operation, the hydrocarbon charge is periodically alternated with a flow of air, or other oxygen-containing gas, to effect a controlled burning of the carbon deposits from the catalyst composite.

A preferred continuous method of effecting the improved process of this invention utilizes a separate reactor and a regenerator, and comprises a repeatable cycle whereby the catalytic composite is continuously passed through the reactor countercurrent or concurrent to the hydrocarbon charge. The catalytic composite is thereafter circulated through the regenerator countercurrently or concurrently with a stream of air, or other oxygen-containing gas, whereby the carbon is burned from the catalyst and the resulting hot regenerated catalyst is circulated to the reactor in contact with further quantities of the hydrocarbon to complete the cycle.

Other suitable methods include the moving bed type of operation, in which the hydrocarbon charge is passed concurrently or countercurrently to a moving catalyst bed, and the fluidized system in which the hydrocarbon is charged in an upflow with entrained catalyst or passed through a dense catalyst phase bed in a reactor in order to maintain the catalyst in a state of turbulence under hindered settling conditions.

The following examples are presented to illustrate the improved process of this invention, utilizing a substantially iron-free catalyst; however, such examples are for the purpose of illustration only and are not intended to limit the scope of the invention.

*Example 1*

A quantity of microspherical catalyst particles, comprising approximately 40 cc., was utilized in a small quartz reactor sized approximately 2″ I.D. and 8″ in length to contact a methane charge stream in a fluidized contact. The catalyst consisted of a support which was 95% alumina and 5% silica with an added active metal component comprising nickel in an amount of 10% by weight of the composite. Actual iron content was determined to be approximately 0.1% iron by weight of the composite. The methane was introduced into the reactor at a gaseous hourly space velocity of about 6,000 to effect contacting of the catalyst at about 1600° F. for a period of 12 seconds. In a continuous cyclic operation, catalyst was subjected to a nitrogen purge stream after effecting the methane conversion for approximately 18 seconds and then subjected to oxidation by an air stream for an approximate 25 seconds to effect substantial removal of the carbon content on the catalyst.

Following the oxidation step the catalyst was again subjected to the nitrogen purge stream before having a methane charge introduced for conversion. In the present test run the present catalyst containing about 0.1% iron providing a hydrogen yield of 91% with approximately 1.8% carbon monoxide present in the stream.

*Example II*

In this example, a similar type of alumina-silica-nickel catalyst sample was treated in the same reactor under similar conditions except, however, that the catalyst was prepared from extra pure alumina providing less than about 0.01% iron by weight of the finished catalyst.

In the test run using the present lower iron content catalyst, the unit provided a yield of 92% hydrogen and approximately 0.8% carbon monoxide.

This result shows a significant improvement over the catalyst of Example I and in effect a preferred processing operation.

*Example III*

In a pilot plant test operation utilizing a fluidized catalyst contacting system, a methane charge stream was subjected to decomposition by fluidized contacting of an alumina-silica-nickel catalyst.

The reactor section of the pilot plant unit employed was made of stainless steel (Type 330) and was 4 inches inside diameter by approximately 8 feet in length. The regenerator section of the unit was an elongated pipe section of 1½" Schedule 80 stainless steel pipe and somewhat over 20 feet in length. Catalyst flow was continuously upward through the regenerator section and continuously downward through the reactor.

The catalyst used comprised a base or support of 95% alumina and 5% silica that had been impregnated with 10% nickel by weight of the support. Also, the catalyst by actual analysis, showed a 0.12 weight percent of iron content at the time of the test run.

Methane was fed to the reactor at a charge rate of 100 s.c.f.h. (standard cubic foot per hour) and contacted at 1600° F. The conversion to hydrogen was found to be 94.0 mole percent purity at a conversion of 92.5%, with carbon monoxide production being 2.3 mole percent.

*Example IV*

In a comparative pilot plant test operation, utilizing the same unit for the fluidized contacting of methane as described in Example III, there was employed an especially treated alumina-silica-nickel catalyst for the conversion of the methane charge stream. Actually, a quantity of 95% alumina, 5% silica base impregnated with 1% nickel, by weight of the support, was subjected to a magnetization treatment such that all free iron or other magnetically active particles were removed from the catalyst. Thus, by analysis, the catalyst used in the test unit during the run of this example was found to contain only about 0.02% by weight of free iron content.

The test run produced hydrogen with 95.1 mole percent purity, at 91.9% conversion, and carbon monoxide contamination of only 0.6 mole percent.

From the foregoing examples it may be seen that there is a definite improvement in effecting the conversion of methane to hydrogen and carbon with the use of a high alumina content catalyst base having nickel impregnation and substantially no iron content. Particularly, an iron content of less than about 0.1% iron by weight of the support.

I claim as my invention:

1. A method for improving the decomposition conversion of a normally gaseous hydrocarbon charge stream to carbon and hydrogen which comprises, contacting said stream at decomposition conditions with a catalyst consisting of alumina-silica and nickel, said catalyst containing less than 0.02% by weight of iron.

2. A method for improving the decomposition of a normally gaseous hydrocarbon charge stream to hydrogen and carbon which comprises, contacting said stream at decompositon conditions with a catalyst consisting essentially of alumina, silica and nickel and said catalyst containing less than about 0.02% by weight of iron.

3. A method for effecting the fluidized contacting of a normally gaseous hydrocarbon stream which comprises effecting the conversion of said stream to hydrogen and carbon at decomposition conditions in a moving column of catalyst particles which consist of a major portion of alumina, a lesser proportion of silica and from about 5% to 15% nickel by weight and said catalyst containing less than about 0.02% by weight of iron.

4. The method of claim 3 wherein said normally gaseous hydrocarbon is methane.

References Cited

UNITED STATES PATENTS 3,129,060   4/1964   Pohlenz _____ 23—212

OSCAR R. VERTIZ, *Primary Examiner.*

EDWARD STERN, *Examiner.*